(12) United States Patent
Sekine

(10) Patent No.: US 11,822,839 B2
(45) Date of Patent: Nov. 21, 2023

(54) STORAGE MEDIUM, IMAGE PROCESSING APPARATUS, AND CONTROL METHOD

(71) Applicant: CANON KABUSHIKI KAISHA, Tokyo (JP)

(72) Inventor: Yuri Sekine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/703,830

(22) Filed: Mar. 24, 2022

(65) Prior Publication Data

US 2022/0317954 A1 Oct. 6, 2022

(30) Foreign Application Priority Data

Mar. 30, 2021 (JP) ................................. 2021-058494

(51) Int. Cl.
*G06F 3/12* (2006.01)
*H04N 1/00* (2006.01)

(52) U.S. Cl.
CPC .......... *G06F 3/1253* (2013.01); *G06F 3/1204* (2013.01); *H04N 1/0044* (2013.01); *H04N 1/00501* (2013.01)

(58) Field of Classification Search
CPC ... G06F 3/1253; G06F 3/1204; H04N 1/0044; H04N 1/00501
See application file for complete search history.

(56) References Cited

U.S. PATENT DOCUMENTS

| 7,839,512 | B2 * | 11/2010 | Kotani | ................... | G06K 15/00 |
| | | | | | 345/11 |
| 2002/0181022 | A1 * | 12/2002 | Tokashiki | .......... | G06K 15/1859 |
| | | | | | 358/1.18 |
| 2010/0245922 | A1 * | 9/2010 | Arai | ...................... | G06F 3/1204 |
| | | | | | 358/1.18 |

FOREIGN PATENT DOCUMENTS

JP 2012212348 A 11/2012

* cited by examiner

*Primary Examiner* — Iriana Cruz
(74) *Attorney, Agent, or Firm* — Canon U.S.A., Inc. IP Division

(57) ABSTRACT

A storage medium stores a program for causing a computer to execute: a display step of displaying a first image and a second image on a page on a screen provided by a first application program in response to a predetermined user operation being performed on a screen provided by a second application program that is different from the first application program; and an instruction step of selecting a print apparatus that prints the page in response to a specific user operation being performed on the screen and instructing the print apparatus to print, in which setting sizes of the first image and second image displayed on the page on the screen provided by the first application program in the display step are respectively controlled to be a first size and a second size that are set in the second application program.

20 Claims, 9 Drawing Sheets

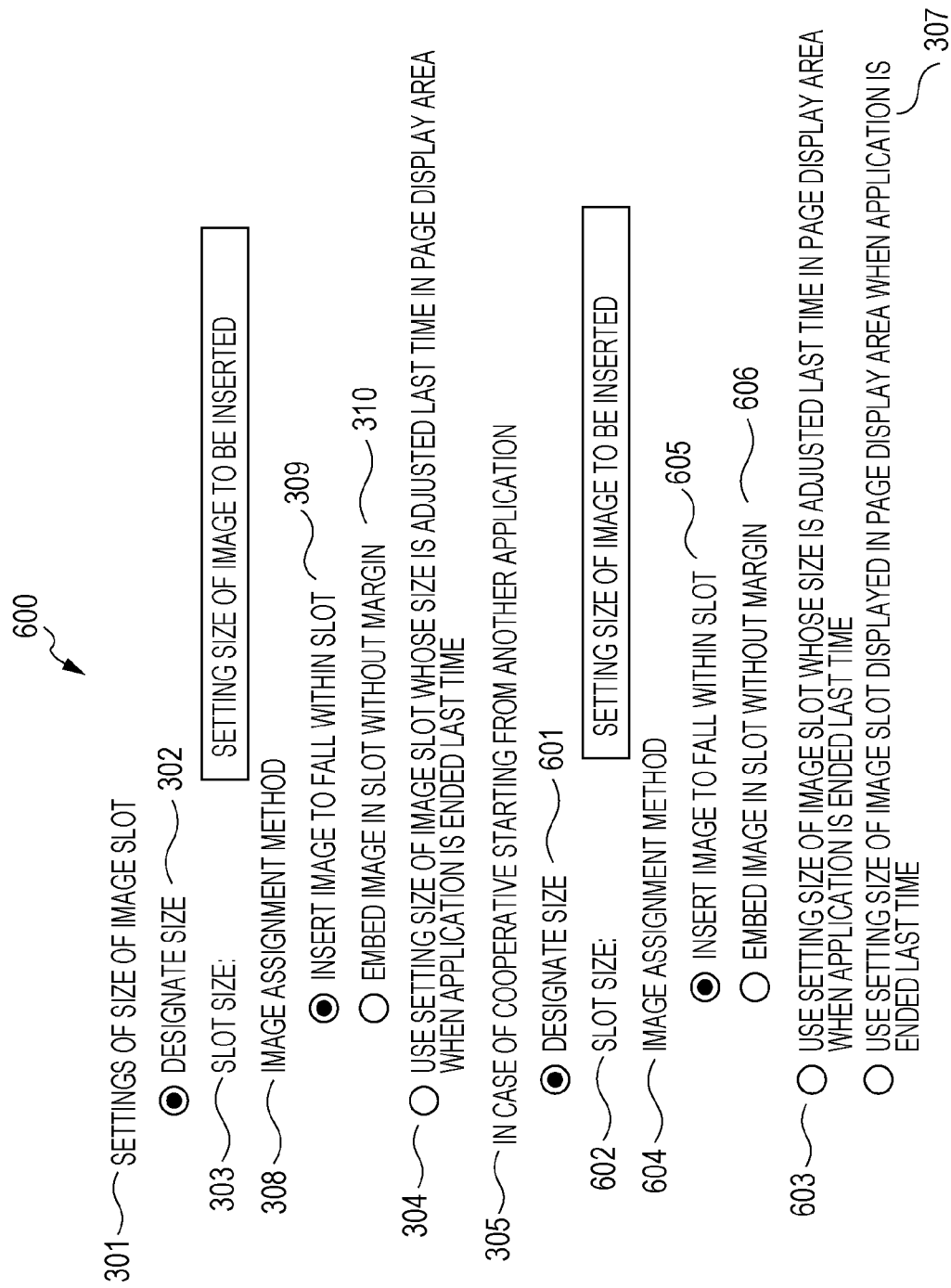

STORAGE MEDIUM, IMAGE PROCESSING APPARATUS, AND CONTROL METHOD

BACKGROUND

Field of the Disclosure

The present disclosure relates to a storage medium, an image processing apparatus, and a control method.

Description of the Related Art

In recent years, a technique has been known in which a page is displayed, an image is displayed on the displayed page, and a print instruction of the page is executed. A print application program that executes the print instruction has, as a method of acquiring an image, a method of acquiring image data at the time of cooperative starting from another application that stores the image data. For example, Japanese Patent Laid-Open No. 2012-212348 discloses a technique in which image data is shared from a cooperation source application program to a cooperation destination application program.

However, Japanese Patent Laid-Open No. 2012-212348 does not take into account a setting size of an image based on the shared image data after the print application program has shared the image data from the other application program.

SUMMARY

Accordingly, some embodiments of the present disclosure set the setting size of the image based on the shared image data to an appropriate size after the print application program has shared the image data from the other application program.

A storage medium according to an aspect of the present disclosure is a storage medium storing a program for causing a computer to execute: a display step of displaying a first image and a second image on a single page on a screen provided by a first application program in response to a predetermined user operation being performed on a screen provided by a second application program that is different from the first application program; and an instruction step of selecting a print apparatus that prints the single page in response to a specific user operation being performed on the screen provided by the first application program and instructing the print apparatus to print, in which a setting size of the first image displayed on the single page on the screen provided by the first application program in the display step is controlled to be a first size that is set in the second application program, and a setting size of the second image displayed on the single page on the screen provided by the first application program is controlled to be a second size that is set in the second application program.

Further features of various embodiments will become apparent from the following description of exemplary embodiments with reference to the attached drawings.

BRIEF DESCRIPTION OF THE DRAWINGS

FIG. 6 illustrates a display example of settings of an image slot size according to a second embodiment.

DESCRIPTION OF THE EMBODIMENTS

Figure 1:
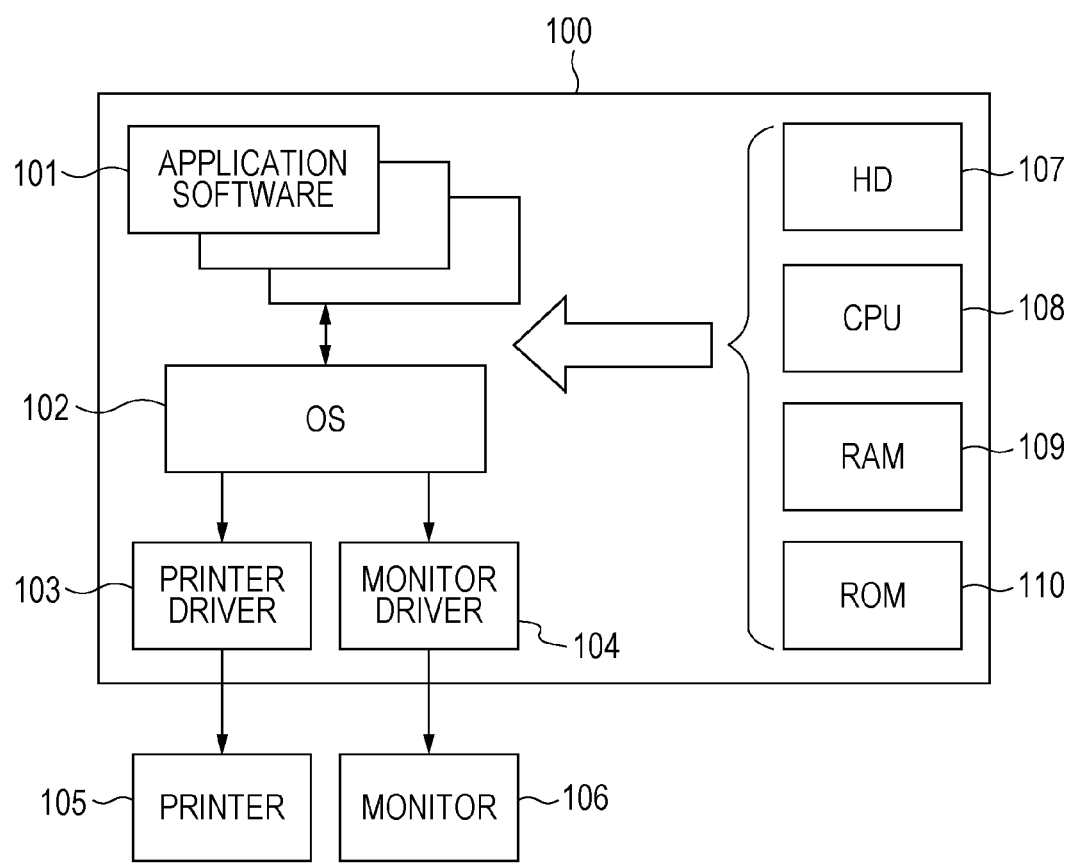
FIG. 1 illustrates a configuration example of a host computer as an image processing apparatus according to an embodiment of the present disclosure.

Now, embodiments of the present disclosure will be described below in detail with reference to the drawings. Note that the following embodiments do not limit every embodiment according to the claims, and all combinations of features described in the embodiments are not always necessary for every embodiment. In addition, the same or substantially the same structural elements are denoted by the same reference numerals in the attached drawings, and repeated description will be omitted.

First Embodiment

Apparatus Configuration

FIG. 1 illustrates a configuration example of a host computer 100 as an image processing apparatus according to this embodiment. The host computer 100 according to this embodiment is an image processing apparatus of any form capable of image processing and may be implemented by various kinds of apparatuses, such as a personal computer (PC), a server, a smartphone, a tablet terminal, and the like.

The host computer 100 includes hardware components, such as a central processing unit (CPU) 108, a hard disk (HD) 107, a random access memory (RAM) 109, a read-only memory (ROM) 110, and the like. These components are connected to one another via an internal bus (not illustrated). The CPU 108 reads out a program stored in the ROM 110 to the RAM 109 and executes the program so as to control operations of the host computer 100. The RAM 109 is used as a temporal storage area when the CPU 108 performs various kinds of processing. The ROM 110 or the HD 107 stores, for example, an operating system (OS) 102, application software 101, which will be described later, and the like. In addition, a printer 105 and a monitor 106, which are external apparatuses, are connected to the host computer 100, for example, via an external interface (I/F) (not illustrated). Note that the printer 105 and the monitor 106 may be connected to the host computer 100 directly via a cable or the like or via a wired or wireless local area network (LAN) or the like.

The host computer 100 further includes, as software components, an application program (hereinafter referred to as application) 101, the OS 102, a printer driver 103, and a monitor driver 104. For example, the host computer 100 includes one or more applications as the application 101, such as a word processor, a spreadsheet, an Internet browser, or a combination thereof.

Now, an application program (hereinafter referred to as application 101a) having a function of arranging (laying out) and editing an image on a page, which is one of the applications in the application 101, will be described. Specifically, the application 101a executes predetermined processing and issues a group of various draw processing commands (e.g., image draw command, text draw command, and graphics draw command) for generating an image that displays a result of the execution of the processing. The group of draw processing commands issued by the application 101a is then input to the monitor driver 104 via the OS 102. If the group of draw processing commands relates to printing, the group of draw processing commands is also input to the printer driver 103 via the OS 102. The printer driver 103 is software for processing the input group of draw processing commands to create printing data and to cause the printer 105 to print the data. The monitor driver 104 is software for processing the input group of draw processing commands to cause the monitor 106 to display an image.

By using text data classified as text, such as characters; graphics data classified as graphics, such as figures; image data classified as photographic images, or the like, the host computer 100 creates output image data with the application 101a. Images based on the output image data are displayed on the monitor 106. In a case where the images based on the output image data are to be printed, the application 101a requests the OS 102 for print out. In this case, a group of draw commands, in which a text data portion is composed of the text draw command, a graphics data portion is composed of the graphics draw command, and an image data portion is composed of the image draw command, is issued for the OS 102.

Screen Configuration Example

Figure 2:
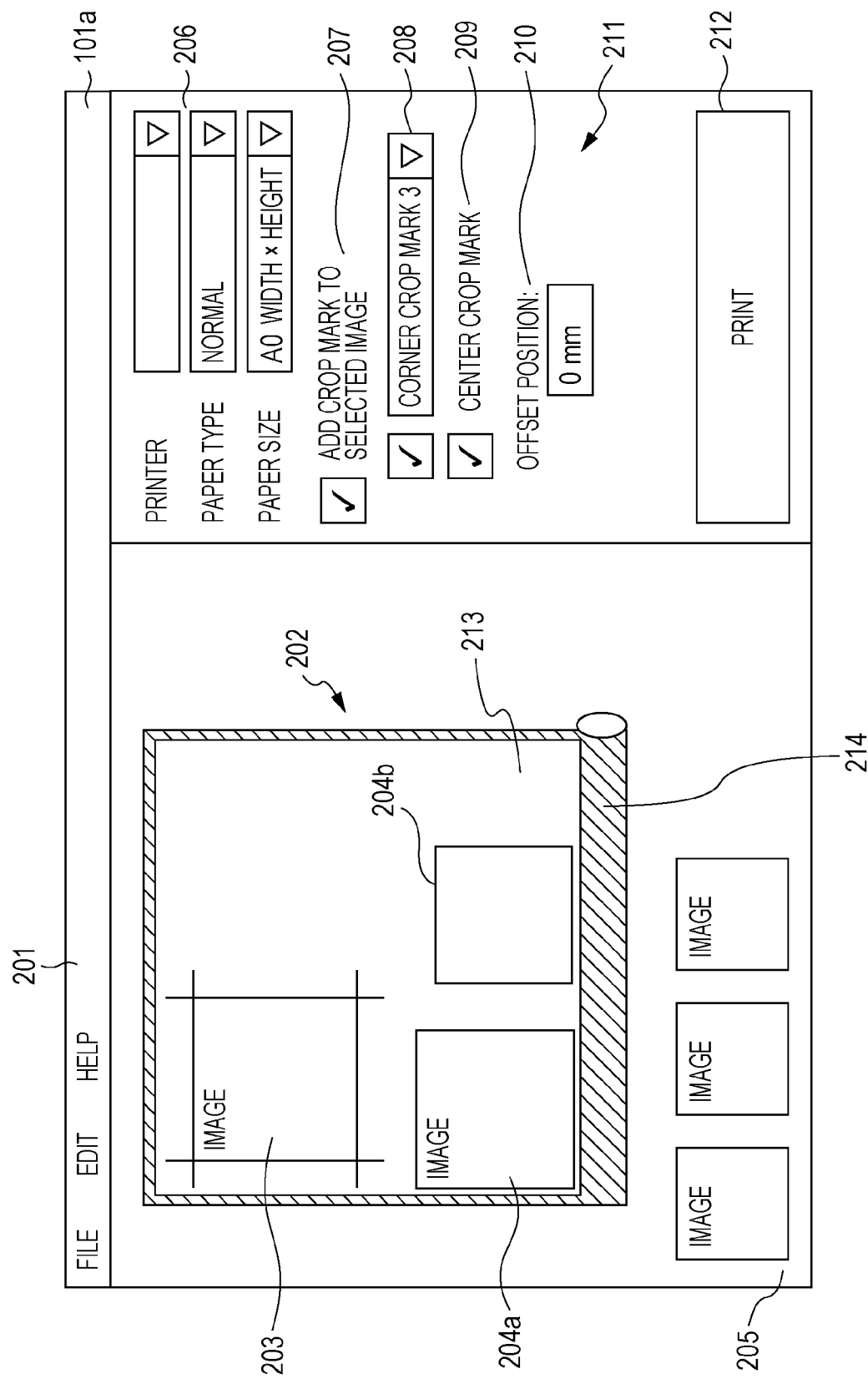
FIG. 2 illustrates a configuration example of a screen of an application having a function of arranging and editing an image on a page according to an embodiment of the present disclosure.

FIG. 2 illustrates a configuration example of an editing screen displayed by the above-described application 101a. The application 101a herein is software for creating output image data in which, for example, a plurality of printing-target images are arranged. For example, with this software, the output image data is displayed on the editing screen, and the printing-target images arranged in the output image data are editable by a user operation. In this example, the editing screen includes a menu operating portion 201, a page display area 202, a thumbnail image display area 205, a print setting portion 206, a crop mark setting portion 211, and a print button 212.

The menu operating portion 201 is an area for accepting a user's selection for functions of ending the application 101a, designating addition of an image on a page, editing an image, and the like. By the user selecting a command displayed in the menu operating portion 201, a corresponding function is executed by the application 101a. For example, the user can select an image displayed in the thumbnail image display area 205 from a file menu in the menu operating portion 201. Then, the user can drag the image displayed in the thumbnail image display area 205 and drop it in the page display area 202, thereby displaying the image in the page display area 202. Note that the image selected by the user from the file menu in the menu operating portion 201 may also be displayed in the page display area 202 instead of the thumbnail image display area 205. In this case, as a method of displaying the image in the page display area 202, which will be described later, the following embodiment may be reflected.

Note that the file menu in the menu operating portion 201 includes a menu for displaying a setting screen 300. The setting screen 300 will be described later. Although the menu for displaying the setting screen 300 is included in the menu operating portion 201 in this embodiment, the setting screen 300 may be displayed in any area on the screen of the application 101a.

The page display area 202 displays pages, images, or image slots created in the page display area 202. That is, the user can arrange, within the page display area 202, any image that the user wishes to print. In addition, the page display area 202 accepts an operation of editing image data arranged on a page. These images are selectable with a pointing device, for example, and settings of a selected image can be performed on the page. For example, settings, such as movement, enlargement, or reduction, of the selected image can be performed in the page display area 202. In the page display area 202, a printable area 213 and a non-printable area 214 are displayed. The printable area 213 represents an area to be actually printed on the page, and the non-printable area 214 represents an area not to be actually printed on the page. The printable area 213 corresponds to an area in which recording (printing) is performed on a recording medium, and a display size of the printable area 213 is set on the basis of the size of a single sheet that is set as a sheet for printing targets. The non-printable area 214 corresponds to an area in which recording is not performed on the recording medium. Although images can be arranged in the non-printable area 214 on the editing screen, even if a print instruction is issued in this state, the area overlapping the non-printable area 214 is not printed. The non-printable area 214 is, for example, a margin area that is secured in order to prevent the interior of the apparatus from getting dirty when an image to be formed is misaligned with a recording medium or when the amount of toner is large. In this embodiment, the page display area 202 displays a page in a state where a roll of paper is set as a sheet for printing targets. However, the page display area 202 may also display a page in a state where cut paper including a blank form (standard sized paper) in the size of A3, A4, etc. is set as a sheet for printing targets. In a case where there are a plurality of pages, the page display area 202 may transit from page to page.

The thumbnail image display area 205 displays thumbnail images representing the images displayed in the page display area 202 and thumbnail images representing candidate images that can be arranged in the page display area 202. Furthermore, in addition to the thumbnail images, the thumbnail image display area 205 also displays, together with the thumbnail images, an icon indicating the number of images corresponding to the respective thumbnail images displayed in the page display area 202. Note that the thumbnail image display area 205 may also display an image stored in the HD 107 and may display a thumbnail image of an image stored in a folder upon the folder being designated by a user operation.

The print setting portion 206 accepts a user operation for various settings regarding printing, such as a printer, a paper type, and a paper size. Now, printer settings will be described. For example, the printer settings may be selected from a drop-down list. First, a user can register a printer that can be connected to the application 101a in "add printer" in a drop-down list menu for the printer settings in the application 101a. Specifically, upon selection of "add printer", a setting screen for adding a printer is displayed. On the displayed setting screen, among printers connected to a network to which the host computer 100 is connected, a printer compatible with the application 101a is displayed. Then, the user can register the displayed printer for the application 101a. The name of the registered printer is displayed in the drop-down list menu on the printer setting screen, and the user can select a printer for printing a printing target. Note that the method of indicating a printer displayed in the drop-down list menu may also be another method instead of displaying the name. The selected printer is wirelessly connected to the host computer 100 and performs printing upon the print button 212, which will be described later, being pressed. Examples of a communication scheme used for connecting apparatuses include a communication standard (Wi-Fi) in the IEEE 802.11 series and Bluetooth (e.g., Bluetooth Classic or Bluetooth Low Energy (BLE)). Note that the apparatuses are not necessarily wirelessly connected to each other. Specifically, for example, the apparatuses may be connected to an access point, such as a wireless LAN router or a base station by Wi-Fi or mobile communication (3G, 4G, or 5G), and communication therebetween may be performed by Internet communication via the access point. The connection may be wired.

Upon the print setting portion 206 accepting a user operation, the page display area 202 displays a result or the like changed by the accepted settings of the printer, the paper type, the paper size, or the like.

The crop mark setting portion 211 accepts settings of a crop mark (printer's mark) to be set for an image selected in the page display area 202. Note that the crop mark setting portion 211 may accept, not only settings of the crop mark to be set for the image selected in the page display area 202, but also, for example, settings of a plurality of crop marks to be set for all images displayed in the page display area 202. An addition selection section 207 accepts a user operation for deciding whether a crop mark is to be set for the image selected in the page display area 202. For example, the addition selection section 207 is a checkbox. For example, if the checkbox is checked, it is determined that a crop mark is set for the image selected in the page display area 202. Then, a type selection section 208, a center crop mark selection section 209, and an offset position setting portion 210 become capable of accepting a user operation. The type selection section 208 accepts selection of the type of crop mark to be set for the image selected on the editing screen. The center crop mark selection section 209 accepts a user operation for deciding whether a center crop mark is to be set for the image selected in the page display area 202. The offset position setting portion 210 accepts settings of an offset position of the crop mark set for the image selected in the page display area 202. Thus, upon the addition selection section 207 accepting an operation for setting a crop mark in a state where any of images in the page display area 202 is selected, the page display area 202 displays a crop-mark-added image 203 in which a crop mark is set for the selected image. Although the crop mark is set for the image, the crop mark may also be set for an image slot. In a case where an image assignment method, which will be described later, is a first assignment method, a margin (edge) is created between two sides, which are either the top and bottom two sides or the left and right two sides, of the image slot and two sides, which are either the top and bottom two sides or the left and right two sides, of the image. In this case, a crop mark is not set at each intersection point (corner) of the sides of the image slot but is set at each intersection point of the sides of the image inserted into the image slot. However, a crop mark may also be set at each intersection point of the sides of the image slot. Note that in a case of a second assignment method, or in a case where the image and the image slot have the same aspect ratio, a crop mark set for the image and a crop mark set for the image slot are displayed to be set at the same position.

The image slot herein is a frame (box) into which an image is inserted. For example, an image displayed in the page display area 202 by a user operation is displayed in a state 204a being inserted into an image slot in the page display area 202. In addition, an image slot 204b in a state where no image is inserted can also be created in the page display area 202. Since the image slot is present, if an image displayed in the page display area 202 is wished to be changed to another image, without changing the size or arrangement to be displayed, only the image can be changed. In addition, in a case where a print product constituted of different images in the same arrangement throughout a plurality of pages is wished to be created, a page on which only an image slot is arranged in advance is copied. Then, by inserting images that are different from page to page into the image slots on the respective pages, the user can shorten the operation time. Herein, as described above, the image is displayed in the page display area 202 in a state of being inserted into the image slot. That is, a setting size of the image displayed in the page display area 202 is set on the basis of a setting size of the image slot, and the image is displayed in a state of being inserted into the image slot. As a result, a display size of the image is set on the basis of a display size of the image slot. Note that definitions of the setting size and the display size will be described later. Herein, a case can be considered where an aspect ratio of the setting size of the image slot mismatches an aspect ratio of the setting size of the image to be inserted into the image slot. A method (hereinafter referred to as image assignment method) of inserting the image into the image slot corresponding to this case will be described. There are two methods as image assignment methods. The first assignment method is a method in which the setting size of the image is enlarged/reduced in accordance with the setting size of the image slot such that the four (all) sides of the image fall within the image slot, and the image is inserted. Specifically, the setting size of the image is enlarged/reduced until the four sides of the image fall within the image slot and either the top and bottom two sides or the left and right two sides of the image is in contact with either the top and bottom two sides or the left and right two sides of the image slot, and the image is arranged at the center of the image slot with the enlarged/reduced setting size. When the image is inserted into the image slot and displayed by this method, a margin (edge) is created between two sides, which are either the top and bottom two sides or the left and right two sides, of the image slot and two sides, which are either the top and bottom two sides or the left and right two sides, of the image. That is, the entire image is displayed within the image slot. The second assignment method is a method in which the setting size of the image is enlarged/reduced in accordance with the setting size of the image slot such that either the top and bottom two sides or the left and right two sides of the image fall within the image slot, and the image is inserted. Specifically, the setting size of the image is enlarged/reduced until either the top and bottom two sides or the left and right two sides of the image fall within the image slot and the two sides of the image within the image slot are in contact with either the top and bottom two sides or the left and right two sides of the image slot, and the image is arranged at the center of the image slot with the enlarged/reduced setting size. When the image is inserted into the image slot and displayed by this method, no margin (edge) is created between two sides, which are either the top and bottom two sides or the left and right two sides, of the image slot and two sides, which are either the top and bottom two sides or the left and right two sides, of the image, and the image is displayed in the entire image slot. That is, part of the image, including two sides not within the image slot, is out of the image slot. The part out of the image slot is not displayed in the page display area 202 and is not printed either.

Note that the user can set either the first assignment method or the second assignment method to be applied as the assignment method when the image is inserted into the image slot. This setting will be described later. In a case where the aspect ratio of the setting size of the image slot matches the aspect ratio of the setting size of the image to be inserted into the image slot, the setting size of the image is enlarged/reduced in accordance with the setting size of the image slot so that the four (all) sides of the image can be in contact with the four (all) sides of the image slot, and the image is inserted.

The print button 212 accepts a print execution instruction by a user operation. Upon the print button 212 being pressed, the application 101a issues a group of various draw processing commands on the basis of the output image data in a state of being displayed in the page display area 202 and the set paper type and paper size. Upon the group of various draw processing commands being input to the printer driver 103 via the OS 102, the printer driver 103 processes the input group of draw processing commands and creates print data. Then, the printer driver 103 transmits the print data to a printer (herein, the printer 105) selected in the print setting portion 206. The printer 105 receives the print data and executes printing on the basis of the received print data. Note that in a case where the application 101a has a function of a printer driver, after issuing the group of various draw processing commands, the application 101a processes the group of various draw processing commands and creates print data. Then, the application 101a transmits the print data to a printer (herein, the printer 105) selected in the print setting portion 206. Now, a method of displaying an image in the page display area 202 will be described. In this embodiment, there are two image display methods compatible with the application 101a. A first method is an image display method using a drag-and-drop operation (hereinafter referred to as first image display method).

Specifically, the first image display method is a method in which an image in the thumbnail image display area 205, on a desktop of the host computer 100, or in a folder or the like is dragged and dropped in the page display area 202 so as to display the image in the page display area 202. Note that the first image display method may also be an image display method using a copy-and-paste operation. Specifically, the first image display method may be a method in which an image in the thumbnail image display area 205, on a desktop of the host computer 100, or in a folder or the like is copied and pasted in the page display area 202 so as to display the image in the page display area 202.

A second method is an image display method using cooperative starting (hereinafter referred to as second image display method).

First, the cooperative starting will be described. As described above, the application 101 is constituted of one or more applications and includes the above-described application 101a and an image editing application (hereinafter referred to as application 101b), such as Adobe Photoshop®. The application 101a can acquire an image from the application 101b. For example, a screen displayed by the application 101b includes a print button, and upon the print button being pressed by a user, the application 101a is started. In the above manner, the starting of the application 101a by a starting method in which an application is started in response to an operation on a screen displayed by another application will be hereinafter referred to as cooperative starting. In the cooperative starting, while the application 101b copies image data generated in the application 101b and shares (transfers) the copied image data to the application 101a, the application 101a can be started. A method of sharing the image data will be described. For example, the application 101b stores image data in a folder that is designated as a plug-in of the application 101a and accessible by the application 101a and the application 101b. Then, the application 101a acquires the image data stored in the designated folder. Thus, the image data is shared from the application 101b to the application 101a. Note that the storage of the image data may be a space in memory or another space instead of the folder. In addition, the image itself or large amounts of data may be stored in the folder and data related to the image may be stored in a space in memory. Furthermore, the storage of the image data may be determined depending on the type of application program. Note that the sharing method may be another method.

That is, the second image display method is a method of displaying, in the page display area 202, an image based on image data that is shared from the application 101b to the application 101a at the time of cooperative starting. Note that the cooperative starting is executed in a state where the application 101a is ended in this embodiment. A case where an operation for cooperative starting is performed in the application 101b in a state where the application 101a is not ended will be described. In this case, the activated application 101a is displayed on the foreground, and the application 101a at this time may acquire image data from the application 101b. Note that the application 101a may display an image by either one of the methods instead of including both methods of displaying an image in the page display area 202.

Now, sizes related to an image defined in this embodiment will be described. In this embodiment, as sizes related to an image, an image slot, and a page, there are a setting size, a display size, and a printing size. The setting size is a size set as a value for each image, each image slot, or a page. Note that the setting size of a page corresponds to a paper size for printing targets. The display size is a size displayed on a screen by the application 101a. More specifically, the display size is a size representing a relative size of the setting size managed by the application 101a, relative to the setting size of a page displayed in the page display area 202. For example, a case where the paper size of the page displayed in the page display area 202 is 1000 mm×1000 mm and the setting size of an image managed by the application 101a is 300 mm×300 mm will be described. In this case, the display size of the image is 3/10 relative to the display size of the page. The printing size is the size of an image on a sheet when the image is printed, and printing is performed such that the printing size of the image equals to the setting size of the image.

However, in the related art, an appropriate setting size has not been set in the application 101a for an image based on image data shared from the application 101b to the application 101a by cooperative starting. Thus, the image has not been displayed with an appropriate display size. Furthermore, when the image is printed, the printing size has not been appropriate.

For example, in a state where an image slot is created in the page display area 202, a user ends the application 101a, adjusts (sets) the setting size of a printing-target image in the application 101b, and causes cooperative starting of the application 101a. Accordingly, the setting size of the image slot displayed in the application 101a of the related art is equal to the setting size of the image slot displayed in the page display area 202 when the application 101a is ended last time.

That is, the setting size of the image slot into which an image is to be inserted, the image slot being displayed in the page display area 202 in the application 101a of the related art, does not reflect the setting size of the image adjusted in the application 101b. As a result, the setting size of the image displayed in the page display area 202 does not reflect the setting size of the image adjusted in the application 101b, either.

The same applies to the display size and the printing size in addition to the setting size. That is, the display size of the image slot into which an image is to be inserted, the image slot being displayed in the page display area 202 in the application 101a of the related art, does not reflect a relative size of the setting size of an image adjusted in the application 101b, relative to the paper size of the page. As a result, the display size of the image inserted into such an image slot does not reflect the relative size of the setting size of the image adjusted in the application 101b, relative to the paper size of the page, either. Thus, the value of the printing size is not equal to the value of the setting size of the image adjusted in the application 101b, either.

Thus, after the cooperative starting, the user has needed to adjust again the setting size of the image slot for the displayed image in the page display area 202 in the application 101a, and thereby, convenience has been reduced.

The same applies to a case where image data of a plurality of images is shared from the application 101b to the application 101a by cooperative starting.

For example, in a state where an image slot is created in the page display area 202, a user ends the application 101a, adjusts the setting size of a plurality of printing-target images in the application 101b, and causes cooperative starting of the application 101a. Accordingly, the setting size of the image slot for each of the plurality of images displayed in the application 101a is equal to the setting size of the image slot displayed in the page display area 202 when the application 101a is ended last time. That is, the setting size of the image slot for each of the plurality of images displayed in the page display area 202 in the application 101a of the related art does not reflect the setting size of the images adjusted in the application 101b. As a result, the setting size of the plurality of images inserted into the respective image slots does not reflect the setting size of the images adjusted in the application 101b.

The same applies to the display size and the printing size of the plurality of images managed by the application 101a in addition to the setting size of the plurality of images. Thus, after the cooperative starting, the user has needed to adjust again the setting size of the image slot for each of the plurality of displayed images in the page display area 202 in the application 101a.

Then, the plurality of images are displayed in a state where each image is inserted into a corresponding one of the image slots each displayed on a corresponding one of a plurality of pages in the page display area 202. Thus, in a case where image slots for a plurality of images are wished to be displayed on a single page, the image slots for the plurality of images have needed to be moved to the single page, and thereby, convenience has been reduced.

In addition, for example, a case where the application 101a is ended in a state where no image slots are created in the page display area 202 and where cooperative starting of the application 101a is caused will be described. In this case, the application 101a is started in a state where no images are displayed in the page display area 202 but images are displayed in the thumbnail image display area 205. Thus, a user first drags an image displayed in the thumbnail image display area 205 and drops the image in the page display area 202, thereby causing the image to be displayed in the page display area 202. Then, the user has needed to adjust the setting size of an image slot of the displayed image, and thereby, convenience has been reduced.

Furthermore, for example, the user has been unable to designate the setting size of the image slot for the image to be displayed in the page display area 202 when causing cooperative starting of the application 101a.

Furthermore, for example, the user has been unable to individually designate settings of the setting size of an image slot in a case where an image is to be displayed by the first image display method described above and settings of the setting size of an image slot in a case where an image is to be displayed by the second image display method described above.

Thus, in this embodiment, an appropriate setting size is set in the application 101a for an image based on image data shared from the application 101b to the application 101a by cooperative starting, and the image is displayed with an appropriate display size. Furthermore, when the image is printed, the printing size is appropriate. Specifically, at the time of cooperative starting, in the application 101a, a setting size based on the image data shared from the application 101b can be designated as the setting size of an image slot for the image to be displayed in the page display area 202.

The same applies to a case where image data of a plurality of images is shared from the application 101b to the application 101a by cooperative starting. Specifically, a setting size based on the image data shared from the application 101b to the application 101a can be designated as the setting size of image slots for the plurality of images to be displayed on a single page in the page display area 202 by the cooperative starting.

The same further applies to a case where the application 101a is ended in a state where no image slots are created in the page display area 202. That is, an image slot for which an appropriate setting size is set in the application 101a is created for an image based on image data shared from the application 101b by cooperative starting, and the image is inserted into this image slot. Thus, not only the setting size, but also the display size and the printing size can be controlled to be appropriate.

Furthermore, the setting size of an image slot for the image to be displayed in the page display area 202 when the cooperative starting of the application 101a is caused can be designated.

Furthermore, the user is able to individually designate settings of the setting size of an image slot in a case where an image is to be displayed in the page display area 202 by the first image display method described above and settings of the setting size of an image slot in a case where an image is to be displayed in the page display area 202 by the second image display method described above. Cases in which the user convenience is improved with these will be described.

Processing Example

Figure 3:
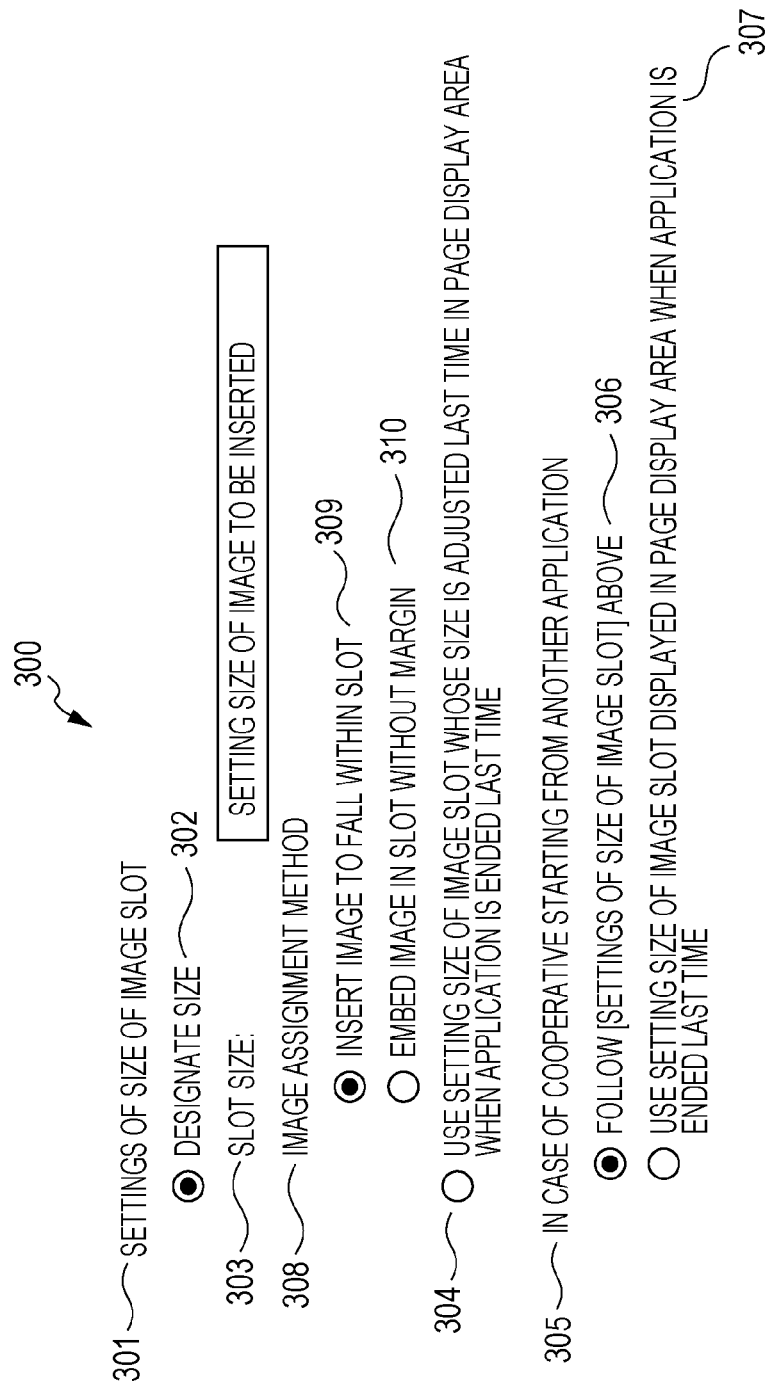
FIG. 3 illustrates a display example of settings of an image slot size according to a first embodiment.

FIG. 3 illustrates an example of a setting screen (hereinafter referred to as setting screen 300) for the setting size of an image slot, the setting screen being a screen displayed by the application 101a and a screen on which the setting size of the image slot for an image to be displayed in the page display area 202 can be set. Note that this screen is displayed by a predetermined menu item in the menu operating portion 201 being selected. The setting screen 300 includes setting portions 301 to 310.

The setting portion 301 accepts, from a user, an operation for setting the setting size of an image slot to be displayed in the page display area 202. The setting portion 301 includes the setting portion 302 and the setting portion 304, which will be described below, and the user selects either one of them as the above operation. Note that the setting portion 301 is an area for performing settings related to an image slot into which an image to be displayed in the page display area 202 by the first image display method is to be inserted. However, as will be described later, in some cases, the setting portion 301 may also be an area for performing settings related to an image slot into which an image to be displayed in the page display area 202 by the second image display method is to be inserted.

The setting portion 302 accepts, from a user, an operation for validating a setting (hereinafter referred to as first setting) for causing an image slot to be displayed in the page display area 202 with a setting size designated by the user. For example, the setting portion 302 is a radio button. In addition, for example, upon the radio button being turned on, the application 101a determines that the first setting is validated. Subsequently, for example, the setting portion 303, which is a drop-down list, becomes capable of accepting a user operation. The setting portion 303 accepts, from a user, designation of the setting size of the image slot to be displayed in the page display area 202 in the first setting. Specifically, the setting portion 303 includes items such as "A4 size", "postcard size", and "setting size of image to be inserted". That is, in the first setting, the image slot is managed by the application 101a as an image slot for which the setting size based on the size designated in the setting portion 303 is set. In addition, in the first setting, the image slot is displayed in the page display area 202 with the display size based on the size designated in the setting portion 303.

The setting portion 304 accepts, from a user, an operation for validating a setting (hereinafter referred to as second setting) for setting the setting size of the image slot to be displayed in the page display area 202 to the same size as the setting size of an image slot whose size is adjusted last time in the page display area 202 when the application 101a is ended last time. For example, the setting portion 304 is a radio button. In addition, for example, upon the radio button being turned on, it is determined that the second setting is validated.

In the setting portion 301, either the first setting or the second setting is validated. Thus, at least, the setting size of the image slot to be displayed when the image is displayed in the page display area 202 by the first image display method is set in accordance with either the first setting or the second setting. Furthermore, the setting size of the image to be inserted into the image slot whose size has been set in the above manner is also set in accordance with either the first setting or the second setting.

In addition, in this embodiment, not only an image slot can be displayed together with an image newly inserted therein in the page display area 202, but also an image slot can be displayed alone without any image inserted therein in the page display area 202. In this embodiment, also when the image slot is displayed in the page display area 202 in such a manner, the image slot is displayed in the page display area 202 with the setting size based on the setting (that is, either the first setting or the second setting) in the setting portion 301.

The setting portion 305 accepts, from a user, an operation for setting the setting size of an image slot into which an image is to be inserted and which is to be displayed in the page display area 202 by the second image display method. The setting portion 305 includes the setting portion 306 and the setting portion 307, which will be described below, and the user selects either one of them as the above operation. Note that the setting in the setting portion 305 can be changed depending on the type of application 101b that is a cooperation source. For example, the name of the application 101b that can cooperate with the application 101a may be displayed in the setting portion 305, and the setting in the setting portion 305 can be performed for each type of application 101b. In addition, the settings in the setting portion 305 are not necessarily reflected depending on the type of application 101b that is a cooperation source.

The setting portion 306 accepts, from a user, an operation for validating a setting (hereinafter referred to as third setting) for following the setting in the setting portion 301 for the setting size of the image slot to be displayed in the page display area 202 by the second image display method. For example, the setting portion 306 is a radio button. In addition, for example, upon the radio button being turned on, it is determined that the third setting is validated.

For example, a case where the third setting is set to be valid in the setting portion 306 and where the first setting is set to be valid in the setting portion 302 will be described. In this case, it is determined that the setting size of the image slot to be displayed in the page display area 202 by the second image display method is set in accordance with the first setting. That is, the image slot to be displayed in the page display area 202 by the second image display method is displayed in the page display area 202 with the setting size based on the size designated in the setting portion 303.

In addition, for example, a case where the third setting is set to be valid in the setting portion 306 and where the second setting is set to be valid in the setting portion 304 will be described. In this case, it is determined that the setting size of the image slot to be displayed in the page display area 202 by the second image display method is set in accordance with the second setting.

The setting portion 307 accepts, from a user, an operation for validating a setting (hereinafter referred to as fourth setting) for setting the setting size of the image slot to be displayed in the page display area 202 by the second image display method to the same size as the setting size of an image slot that is displayed in the page display area 202 when the application 101a is ended last time. For example, the setting portion 307 is a radio button. In addition, for example, upon the radio button being turned on, the application 101a determines that the fourth setting is validated.

In the setting portion 305, either the third setting or the fourth setting is validated. Thus, the setting size of the image slot into which an image is to be inserted and which is to be displayed in the page display area 202 by the second image display method is set in accordance with either the third setting or the fourth setting. Furthermore, the setting size of the image to be inserted into the image slot whose size has been set in the above manner is also set in accordance with either the third setting or the fourth setting.

In addition, in this embodiment, not only an image slot can be displayed together with an image newly inserted therein in the page display area 202, but also an image slot can be displayed alone without any image inserted therein in the page display area 202. In this embodiment, also when the image slot is displayed in the page display area 202 in such a manner, the image slot is displayed in the page display area 202 with the setting size based on the setting (that is, either the third setting or the fourth setting) in the setting portion 305.

The setting portion 308 accepts, from a user, an operation for validating a setting of an image assignment method. The setting portion 308 includes the setting portion 309 and the setting portion 310, which will be described below, and the user selects either one of them as the above operation. The setting portion 309 accepts, from a user, an operation for validating a setting for applying the first assignment method in a case where an image is to be inserted into an image slot. For example, the setting portion 309 is a radio button. In addition, for example, upon the radio button being turned on, the application 101a determines that the setting for applying the first assignment method is validated. The setting portion 310 accepts, from a user, an operation for validating a setting for applying the second assignment method when an image is inserted into an image slot. For example, the setting portion 310 is a radio button. In addition, for example, upon the radio button being turned on, the application 101a determines that the setting for applying the second assignment method is validated. Note that the setting portion 308 becomes capable of accepting a user operation in a case where the first setting is validated in the setting portion 302 and in a case where the third setting is set to be valid in the setting portion 306 and where the first setting is set to be valid in the setting portion 302. Now, the assignment method applied in a case where the second setting is validated in the setting portion 304 and in a case where the third setting is set to be valid in the setting portion 306 and where the second setting is set to be valid in the setting portion 304 will be described. In both cases, an image is inserted into an image slot in accordance with an assignment method that is set when an image slot whose size is adjusted last time in the page display area 202 when the application 101a is ended last time is created in the page display area 202. In the assignment method in which the fourth setting is validated in the setting portion 307, an image is inserted into an image slot in accordance with an assignment method that is set when an image displayed in the page display area 202 when the application 101a is ended last time is created in the page display area 202. Note that a user operation for selecting an assignment method may be acceptable in either case. Note that the assignment method may be changeable even after the image is displayed in the page display area 202. For example, the setting screen may be displayed in response to the displayed image being selected, and the assignment method may be changeable.

Now, a use case where the settings on the setting screen 300 are reflected will specifically be described. For example, a case where the third setting and the first setting are set to be valid on the setting screen 300 and where "setting size of image to be inserted" is selected in the setting portion 303 will be described. Note that the item "setting size of image to be inserted" is a setting item for setting the setting size adjusted for an image to be inserted in the application 101b to the setting size of an image slot in the application 101a. For example, a user adjusts the setting size of an image that is a printing target in the application 101b and causes cooperative starting of the application 101a. Then, in a case where the above settings are set in the setting screen 300, the adjusted setting size of an image that is a printing target in the application 101b is reflected for an image slot for the image to be displayed in the page display area 202 in the application 101a. Furthermore, the image slot is displayed with a display size based on the adjusted setting size of the image that is a printing target in the application 101b. Thus, the user does not need to adjust again the setting size of the image slot for the displayed image in the page display area 202 in the application 101a, and thereby, convenience is improved.

Figure 4:
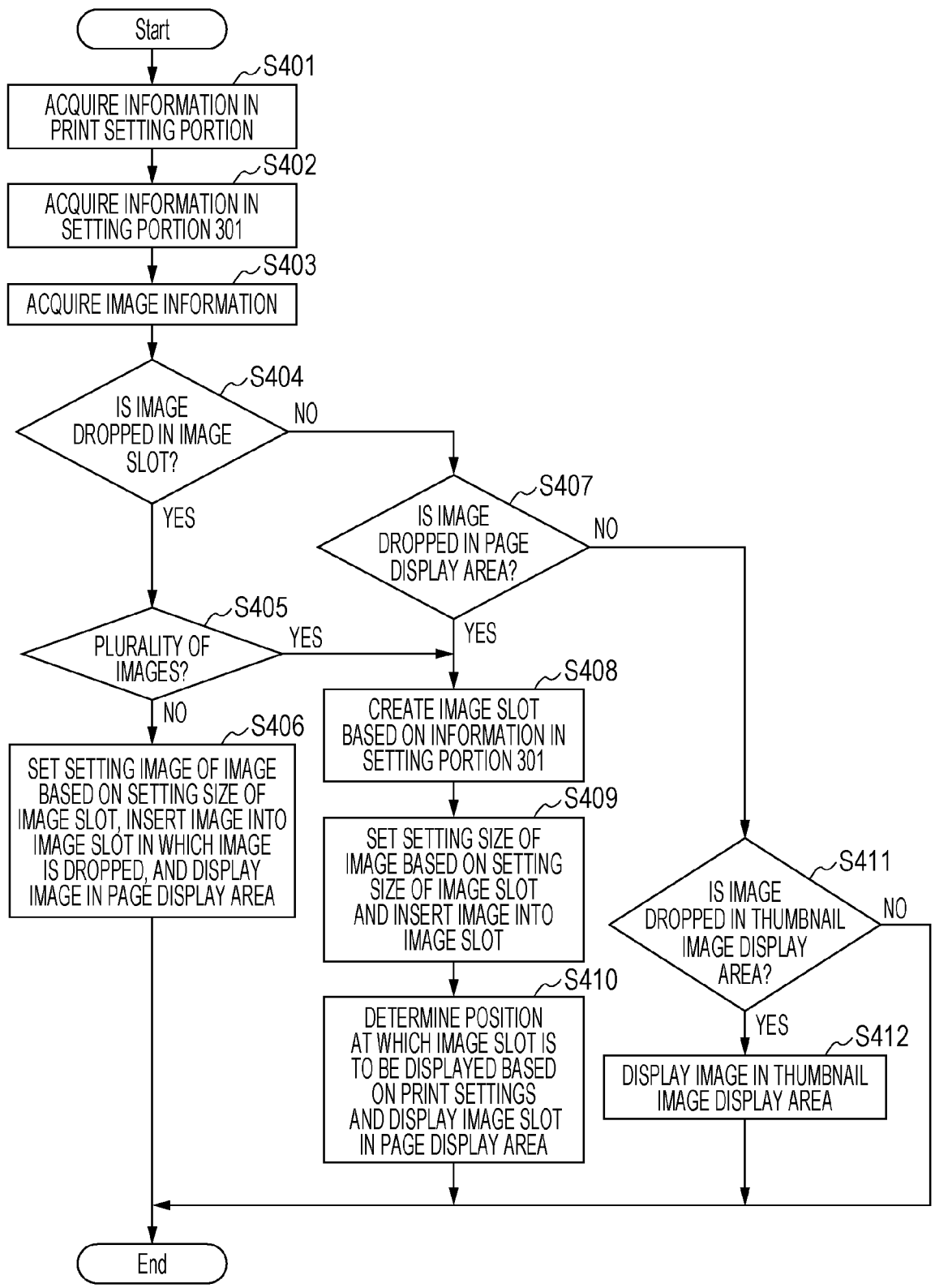
FIG. 4 is a flowchart illustrating a processing example of an application according to the first embodiment.

FIG. 4 is a flowchart illustrating a processing example of the application 101a in a case where an image is displayed in the page display area 202 by the first image display method. For example, the flowchart is implemented by the CPU 108 reading out the application 101a stored in the ROM 110 to the RAM 109 and executing it. For example, the CPU 108 starts this processing in response to the application 101a detecting an operation for the first image display method performed in the page display area 202 in the application 101a. Note that the operation for the first image display method is a drop operation of an image from the thumbnail image display area 205, the desktop of the host computer 100, or the like.

In S401, the CPU 108 acquires information that is set in the print setting portion 206. The information that is set in the print setting portion 206 is, for example, information on various settings regarding printing, such as a printer, a paper type, a paper size, and a feeding method. The CPU 108 further acquires information that is set for a layout mode. The layout mode herein is a mode that differs depending on the number of images arranged on a single sheet. For example, by a setting item, a standard (single-image) mode, an allocation (multi-image) mode, or an automatic arrangement mode can be selected. The automatic arrangement mode is a mode in which images are automatically arranged in accordance with arrangement provided by the application 101a. The standard mode is a mode in which only a single image is arranged on a page in the page display area 202. In a case where a plurality of images are to be inserted in the standard (single-image) mode, each one of the images is displayed on a corresponding page of a plurality of pages in the page display area 202. The allocation mode is a mode in which only a plurality of images are arranged on a page in the page display area 202. Even in the allocation mode, a plurality of pages can be created.

The automatic arrangement mode is a mode in which the application 101a automatically changes and sets arrangement of images displayed by the application 101a without accepting a user operation of designating destinations of the images. In a state where the application 101a is in operation in the automatic arrangement mode, when a first image is displayed in the page display area 202, the first image is automatically arranged by the application 101a in the upper left of a single page in the page display area 202. Then, when a second image is displayed in the page display area 202, the second image is automatically arranged by the application 101a on the right of the first image with a predetermined interval therebetween. This is repeated, and if an image overlaps the non-printable area 214, a new line is started, and the image is automatically arranged by the application 101a in the upper left of the single page in an area not overlapping images that are already present. Subsequently, an operation of arranging an image on the right with a predetermined interval therebetween is automatically repeated by the application 101a. Note that images may be automatically arranged by another algorithm in the automatic arrangement mode. Note that the layout mode may include another mode or may include only the automatic arrangement mode.

In S402, the CPU 108 acquires information that is set in the setting portion 301. The information that is set in the setting portion 301 includes, for example, whether the radio button in the setting portion 302 is turned on and whether the radio button in the setting portion 304 is turned on. Furthermore, if the radio button in the setting portion 302 is turned on, the information that is set in the setting portion 301 includes information on an item that is selected in the setting portion 303. If the radio button in the setting portion 304 is turned on, the information that is set in the setting portion 301 includes information on the setting size of an image slot whose size is adjusted last time in the page display area 202 when the application 101a is ended last time.

In S403, the CPU 108 acquires information on an image to be displayed by the first image display method. The information to be acquired includes information on the number of images dropped in the page display area 202, the setting size that is set for the image dropped in the page display area 202, an aspect ratio of the setting size, and the like. The setting size is set for each image by another application other than the application 101a or is set in response to a setting operation being accepted by the image itself stored on a desktop or in a folder.

In S404, the CPU 108 determines whether an operation for the first image display method detected at the start of the flowchart is a drop operation of the image in an image slot in the page display area 202. If the determination is YES, the CPU 108 advances to S405; if the determination is NO, the CPU 108 advances to S407.

In S405, the CPU 108 determines whether the operation for the first image display method detected at the start of the flowchart is a drop operation of a plurality of images. If the determination is YES, the CPU 108 advances to S408; if the determination is NO, the CPU 108 advances to S406.

In S406, the CPU 108 sets the setting size of the image dropped in the image slot in the page display area 202 on the basis of the setting size of the image slot in which the image is dropped. Specifically, the CPU 108 sets the setting size of the image to the setting size of the image slot in which the image is dropped, on the basis of the information acquired in S403 on the setting size that is set for the image on which the operation for the first image display method is performed. Subsequently, the CPU 108 inserts the image into the image slot. Then, the image inserted into the image slot is displayed in the page display area 202, with a display size corresponding to a relative relationship of the setting size of the image to the setting size of a page displayed in the page display area 202. Subsequently, the processing in the flowchart ends.

In S407, which is performed if the determination in S404 is NO, the CPU 108 determines whether the operation for the first image display method detected at the start of the flowchart is a drop operation of the image in an area in the page display area 202 and out of the image slot. Note that the page display area 202 includes the printable area 213 and the non-printable area 214. If the determination is YES, the CPU 108 advances to S408; if the determination is NO, the CPU 108 advances to S411.

In S408, the CPU 108 creates an image slot on the basis of the information acquired in S402. First, the CPU 108 checks states of the radio buttons in the setting portion 301. If the radio button in the setting portion 302 is turned on and the first setting is validated, the image slot is created with a setting size based on the size selected in the setting portion 303. If the radio button in the setting portion 304 is turned on and the second setting is validated, the image slot is created with the setting size of the image slot whose size is adjusted last time in the page display area 202 when the application 101a is ended last time. As described above, if a plurality of images are to be displayed in the page display area 202 by the operation for the first image display method, the CPU 108 advances to S408 regardless of whether the drop operation is performed in an image slot. However, one image of a plurality of images may be inserted into the image slot in which the image is dropped in a manner described in S406, and the rest of the images may be regarded as being dropped in an area in the page display area 202 and out of the image slot, and the CPU 108 may advance to S408. Thus, for each of a plurality of images that are dropped in an area in the page display area 202 and out of the image slot, a corresponding image slot is created in the above manner as the processing in S408.

In S409, the CPU 108 sets the setting size of the image dropped in the image slot in the page display area 202 on the basis of the setting size of the image slot created in S408. Specifically, the CPU 108 sets the setting size of the image to the setting size of the image slot created in S408, on the basis of the information acquired in S403 on the setting size that is set for the image on which the operation for the first image display method is performed. Subsequently, the CPU 108 inserts the image into the image slot. If a plurality of images are dropped in an area in the page display area 202 and out of the image slot, each image is inserted into a corresponding one of a plurality of image slots that are created.

In S410, on the basis of the information acquired in S401 on print settings and the layout mode set in the application 101a, the CPU 108 determines a position at which the image slot created in S409, into which the image is inserted, is to be displayed in the page display area 202. Furthermore, the CPU 108 causes the image slot to be displayed in the page display area 202 with a display size corresponding to a relative relationship of the setting size of the image slot to the setting size of a page displayed in the page display area 202. The CPU 108 may also cause the image slot created in S409, into which the image is inserted, at a position at which the image is dropped in the page display area 202. If a plurality of images are dropped in an area in the page display area 202 and out of the image slot, a plurality of image slots into each of which a corresponding one of the plurality of images is inserted are displayed in the page display area 202 with the display size adjusted as described above. Subsequently, the processing in the flowchart ends.

In S411, which is performed if the determination in S407 is NO, the CPU 108 determines whether the operation for the first image display method detected at the start of the flowchart is a drop operation of the image in the thumbnail image display area 205. If the determination is YES, the CPU 108 advances to S412; if the determination is NO, the processing in the flowchart ends.

In S412, the CPU 108 causes the image on which the operation for the first image display method is performed to be displayed, not in the page display area 202, but in the thumbnail image display area 205. Subsequently, the processing in the flowchart ends. Although the image displayed in the thumbnail image display area 205 is displayed to be left justified in the order the operation for the first image display method is performed, the image may also be displayed in another manner.

In the above manner, an appropriate setting size can be set for the image to be displayed in the page display area 202 by the first image display method, and the image can be displayed with an appropriate display size.

Figure 5A:
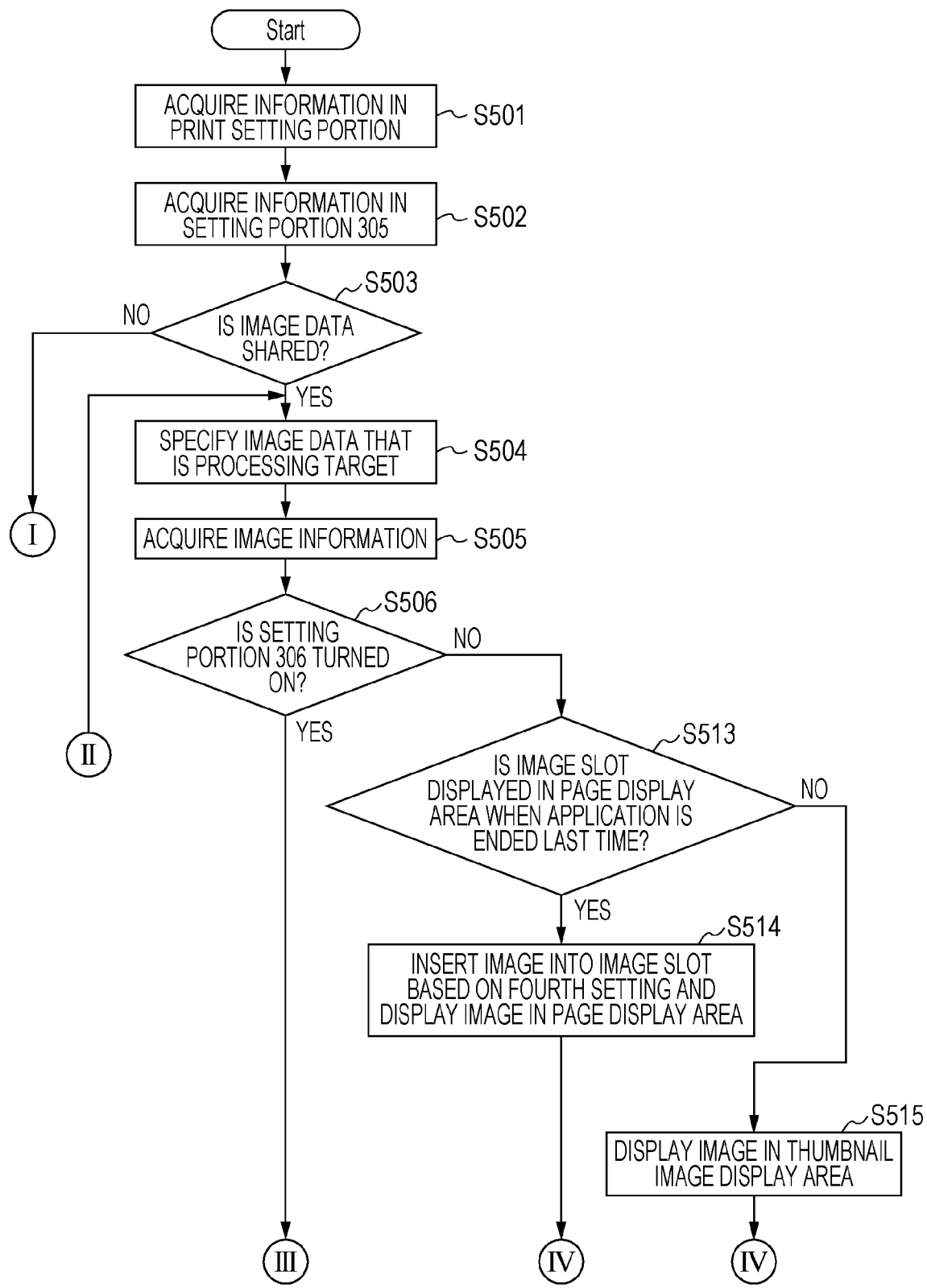
FIGS. 5A and 5B are a flowchart illustrating a processing example of the application according to the first embodiment.
Figure 5B:
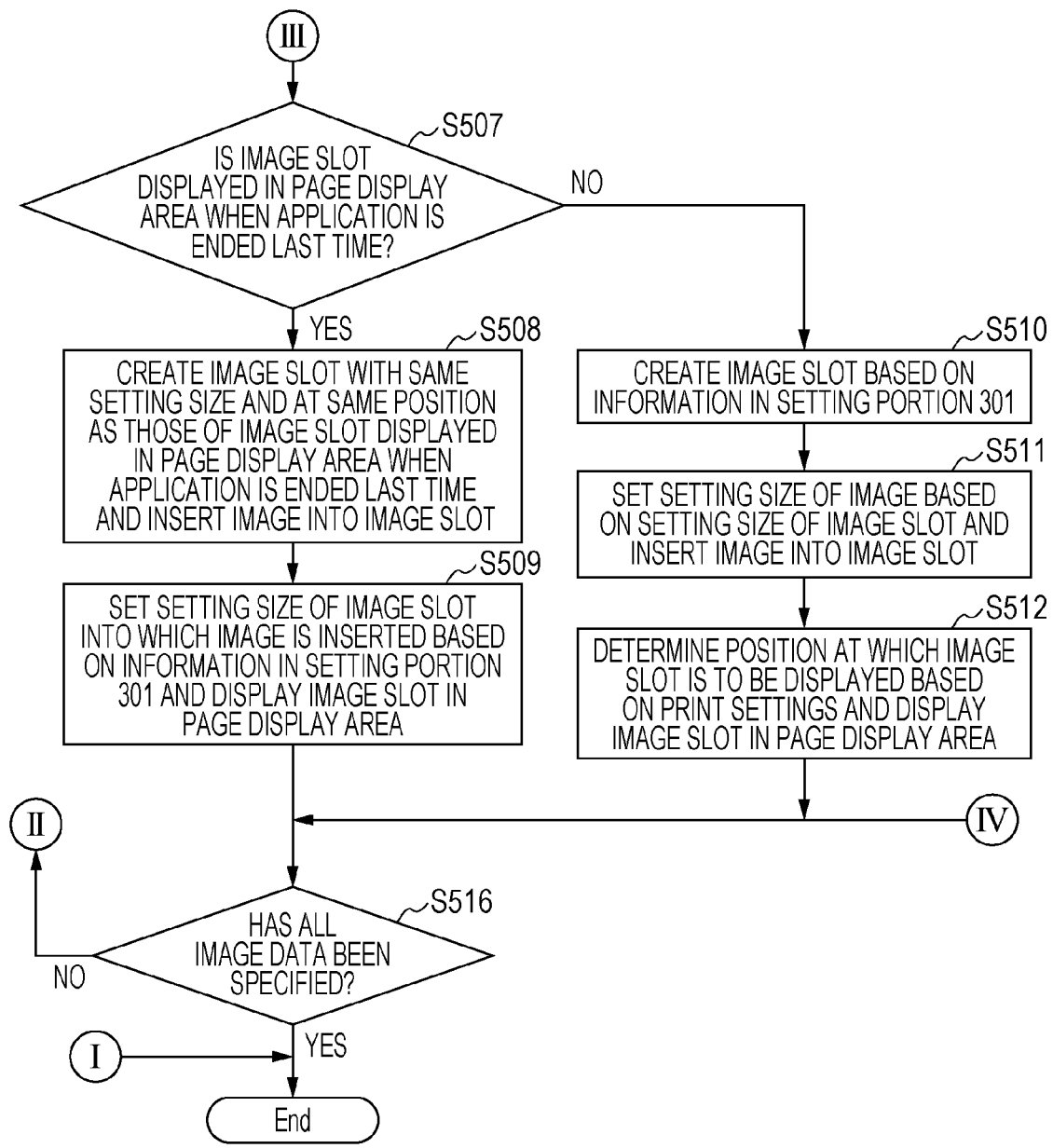

FIGS. 5A and 5B are a flowchart illustrating a processing example of the application 101a in a case where an image is displayed by an operation for the second image display method. For example, the flowchart is implemented by the CPU 108 reading out the application 101a stored in the ROM 110 to the RAM 109 and executing it. For example, the CPU 108 starts this processing in response to the application 101a detecting cooperative starting by the application 101b.

S501 is substantially the same as S401, and thus, description thereof is omitted.

In S502, the CPU 108 acquires information that is set in the setting portion 305. The information that is set in the setting portion 305 includes, for example, whether the radio button in the setting portion 306 is turned on and whether the radio button in the setting portion 307 is turned on. Furthermore, if the radio button in the setting portion 306 is turned on, the information that is set in the setting portion 305 includes whether the radio button in the setting portion 302 is turned on and whether the radio button in the setting portion 304 is turned on. In addition, if the radio button in the setting portion 302 is turned on, the information that is set in the setting portion 305 includes information on an item that is selected in the setting portion 303. If the radio button in the setting portion 304 is turned on, the information that is set in the setting portion 305 includes information on the setting size of an image slot whose size is adjusted last time in the page display area 202 when the application 101a is ended last time. Furthermore, if the radio button in the setting portion 307 is turned on, the information that is set in the setting portion 305 includes information on the setting size of an image slot that is displayed in the page display area 202 when the application 101a is ended last time.

In S503, the CPU 108 determines whether image data is shared from the application 101b. If the determination is YES, the CPU 108 advances to S504; if the determination is NO, the processing in the flowchart ends.

In S504, the CPU 108 specifies any image data that is yet to be specified in S504 in the image data shared from the application 101b. For example, if image data of a plurality of images is shared, the CPU 108 specifies any one image; if image data of a single image is shared, the CPU 108 specifies the single image.

In S505, the CPU 108 acquires image information regarding the image data specified in S504. The acquired information includes information such as a setting size set for the image and an aspect ratio of the setting size.

In S506, the CPU 108 determines whether the radio button in the setting portion 306 in the setting portion 305 is turned on. If the radio button in the setting portion 306 is turned on and the third setting is validated (YES in S506), the CPU 108 advances to S507 and sets the setting size and the display size of an image slot and the image in the following processing on the basis of the third setting. If the radio button in the setting portion 306 is not turned on and the fourth setting is validated (NO in S506), the CPU 108 advances to S513. If the determination in S513 is NO, the CPU 108 sets the setting size and the display size of the image slot and the image through the following processing on the basis of the fourth setting.

In S507, the CPU 108 determines whether an image slot is displayed in the page display area 202 when the application 101a is ended last time. If the determination is YES, the CPU 108 advances to S508; if the determination is NO, the CPU 108 advances to S510.

In S508, the CPU 108 creates an image slot with the same setting size and at the same position as those of the image slot that is displayed in the page display area 202 when the application 101a is ended last time. Then, the CPU 108 inserts the image into the created image slot. Note that in a case where there are a plurality of image slots displayed in the page display area 202 when the application 101a is ended last time, the CPU 108 may insert the image into an image slot that is created last time among the image slots displayed last time or may insert the image into another image slot.

In S509, the CPU 108 sets the setting size of the image slot created in S508, into which the image is inserted, on the basis of the information (settings in the setting portion 301) acquired in S502. Note that the setting size of the image inserted into the image slot is set in accordance with the settings of the setting size of the image slot. Then, the image slot into which the image is inserted is displayed in the page display area 202, with a display size corresponding to a relative relationship of the setting size of the image slot to the setting size of a page displayed in the page display area 202. Specifically, the CPU 108 changes the setting size of the image slot created in S508, into which the image is inserted, on the basis of the information acquired in S502. First, the CPU 108 checks states of the radio buttons in the setting portion 301. If the radio button in the setting portion 302 is turned on and the first setting is validated, the setting size of the image slot into which the image is inserted is set to a setting size based on the size selected in the setting portion 303. For example, if the size selected in the setting portion 303 is "setting size of image to be inserted", the setting size of the image slot is set to the setting size of the image to be inserted therein. That is, if the setting size of the image that is a printing target is adjusted in the application 101b and cooperative starting of the application 101a is caused, the setting size of the image slot into which the image is to be inserted is set to the setting size of the image adjusted in the application 101b. Thus, the image is inserted into the image slot with the setting size adjusted in the application 101b. Thus, an appropriate setting size can be set in the application 101a for the image based on the image data shared from the application 101b to the application 101a by the cooperative starting, and the image can be displayed with an appropriate display size. Furthermore, when the image is printed, the printing size is appropriate.

Now, a case where the radio button in the setting portion 304 is turned on and the second setting is validated will be described. In this case, the setting size of the image slot into which the image is inserted is set to the setting size of the image slot whose size is adjusted last time in the page display area 202 when the application 101a is ended last time. Note that the order of S508 and S509 may be interchanged. That is, first, the setting size of the image slot displayed in the page display area 202 when the application 101a is ended last time is set on the basis of the information acquired in S502. Subsequently, the setting size of the image is set on the basis of the setting size of the image slot, and the image is inserted into the image slot. Thus, the image slot into which the image is inserted based on the information acquired in S502 may be created.

In S510, which is performed if the determination in S507 is NO, the CPU 108 creates an image slot on the basis of the information acquired in S502. First, the CPU 108 checks states of the radio buttons in the setting portion 301. If the radio button in the setting portion 302 is turned on and the third setting is validated, the image slot is created with a setting size based on the size selected in the setting portion 303. For example, if the size selected in the setting portion 303 is "setting size of image to be inserted", the setting size of the image slot is set to the setting size of the image to be inserted therein.

That is, if the setting size of the image that is a printing target is adjusted in the application 101b and cooperative starting of the application 101a is caused, the setting size of the image slot into which the image is to be inserted is set to the setting size of the image adjusted in the application 101*b*.

If the radio button in the setting portion 304 is turned on and the third setting is validated, the image slot is created with the setting size of the image slot whose size is adjusted last time in the page display area 202 when the application 101*a* is ended last time.

In S511, the CPU 108 sets the setting size of the image on the basis of the setting size of the image slot created in S510. Specifically, on the basis of the information acquired in S505 regarding the setting size set for the image on which an operation for the second image display method is performed, the CPU 108 sets the setting size of the image to the setting size of the image slot created in S510. Then, the image is inserted into the image slot. For example, if the setting size of the created image slot is "setting size of image to be inserted", the setting size of the image is set on the basis of the setting size of the image slot, and thus, the setting size of the image is set to "setting size of image to be inserted". That is, if the setting size of the image that is a printing target is adjusted in the application 101*b* and cooperative starting of the application 101*a* is caused, the setting size of the image is set to the setting size adjusted in the application 101*b*. Thus, the image is inserted into the image slot with the setting size adjusted in the application 101*b*. Thus, an appropriate setting size can be set in the application 101*a* for the image based on the image data shared from the application 101*b* to the application 101*a* by the cooperative starting, and the image can be displayed with an appropriate display size. Furthermore, when the image is printed, the printing size is appropriate.

In S512, on the basis of the information acquired in S501 regarding the printing settings and the layout mode set in the application 101*a*, the CPU 108 determines the position at which the image slot created in S511, into which the image is inserted, is to be displayed in the page display area 202. Furthermore, the CPU 108 causes the image slot to be displayed in the page display area 202 with a relative size to the paper size of the page displayed in the page display area 202.

In S513, which is performed if the determination in S506 is NO, the CPU 108 determines whether an image slot is displayed in the page display area 202 when the application 101*a* is ended last time. If the determination is YES, the CPU 108 advances to S514; if the determination is NO, the CPU 108 advances to S515.

In S514, the CPU 108 creates an image slot with the same setting size and at the same position as those of the image slot that is displayed in the page display area 202 when the application 101*a* is ended last time. Then, the CPU 108 sets the setting size of the image to the setting size of the created image slot and inserts the image into the image slot. Furthermore, the image slot into which the image is inserted is displayed in the page display area 202 with a display size corresponding to a relative relationship of the setting size of the image slot to the setting size of the page displayed in the page display area 202. Note that in a case where there are a plurality of image slots displayed in the page display area 202 when the application 101*a* is ended last time, the CPU 108 may insert the image into an image slot that is created last time among the image slots displayed last time or may insert the image into another image slot.

In S515, the CPU 108 causes the image on which the operation for the second image display method is performed to be displayed, not in the page display area 202, but in the thumbnail image display area 205. Although the image displayed in the thumbnail image display area 205 is displayed to be left justified in the order the operation for the second image display method is performed, the image may also be displayed in another manner.

In S516, the CPU 108 determines whether all the image data shared from the application 101*b* has been specified. If the determination is NO, the CPU 108 returns to S504 and specifies image data that is yet to be specified in the image data of a plurality of images shared from the application 101*b*. Then, the CPU 108 arranges images based on the image data on a single page with the setting size based on the settings on the screen in FIG. 3. Thus, the plurality of images based on the image data of a plurality of images shared from the application 101*b* can be arranged on a single page with a size designated by a user. If the determination is YES, the CPU 108 ends the processing in the flowchart.

As described above, according to this embodiment, a user can display images in the application 101*a*, based on the image data shared from the application 101*b* by the cooperative starting, with an appropriate size in the application 101*a*. This can reduce image slots displayed in the page display area 202 with an unintended image slot size, thereby improving the user convenience.

Second Embodiment

The first embodiment has described processing in a case where an image based on image data shared from the application 101*b* to the application 101*a* by cooperative starting is displayed with an appropriate size in the application 101*a*. The second embodiment will describe processing, which is different from that in the first embodiment, in a case where an image based on image data shared from the application 101*b* to the application 101*a* by cooperative starting is displayed with an appropriate size in the application 101*a*. Note that a processing example of the application 101*a* in a case where an image is displayed by an operation for the first image display method according to the second embodiment is substantially the same as that in the flowchart illustrated in FIG. 4; thus, different points from the first embodiment will mainly be described below.

Processing Example

FIG. 6 illustrates an example of a setting screen (hereinafter referred to as setting screen 600) for the size of an image slot, the setting screen being a screen displayed by the application 101*a* and a screen on which the size of the image slot for an image to be displayed in the page display area 202 can be set. Note that this screen is displayed by a predetermined menu item in the menu operating portion 201 being selected. The setting screen 600 includes the setting portions 301 to 305 and 307 and setting portions 601 to 606. Note that the setting portions 301 to 305 and 307 are substantially the same as those in FIG. 3, and thus, description thereof is omitted. The setting portion 601 accepts, from a user, an operation for validating a setting (hereinafter referred to as fifth setting) for causing an image slot to be displayed in the page display area 202 by an operation for the second image display method with a size designated by the user. For example, the setting portion 601 is a radio button. In addition, for example, upon the radio button being turned on, it is determined that the fifth setting is validated. Subsequently, for example, the setting portion 602, which is a drop-down list, becomes capable of accepting a user operation. The setting portion 602 accepts, from a user, designation of the setting size of the image slot to be displayed in the page display area 202 in the fifth setting. Specifically, the setting portion 602 includes items such as "A4 size", "postcard size", and "setting size of image to be inserted". That is, in the fifth setting, the image slot is managed by the application 101a as an image slot for which the setting size based on the size designated in the setting portion 602 is set. In addition, in the fifth setting, the image slot is displayed in the page display area 202 with the display size based on the size designated in the setting portion 602.

The setting portion 603 accepts, from a user, an operation for validating a setting (hereinafter referred to as sixth setting) for causing an image slot to be displayed in the page display area 202 by an operation for the second image display method with the same size as the setting size of an image slot whose size is adjusted last time in the page display area 202 when the application 101a is ended last time. For example, the setting portion 603 is a radio button. In addition, for example, upon the radio button being turned on, it is determined that the sixth setting is validated.

An image is displayed in the application 101a on the basis of the fifth setting, the sixth setting, or the fourth setting in the setting portion 305. In the setting portion 305, any of the fifth setting, the sixth setting, and the fourth setting is validated. Thus, at least, the setting size of the image slot into which an image is to be inserted and which is to be displayed in the page display area 202 by the second image display method is set in accordance with any of the fifth setting, the sixth setting, and the fourth setting. Furthermore, the setting size of the image to be inserted into the image slot whose size has been set in the above manner is also set in accordance with any of the fifth setting, the sixth setting, and the fourth setting.

The setting portion 604 accepts, from a user, an operation for validating a setting of an assignment method of an image to be inserted into the image slot to be displayed in the page display area 202 by an operation for the second image display method. The setting portion 604 includes the setting portion 605 and the setting portion 606, and the user selects either one of them as the above operation. The setting portion 605 and the setting portion 606 are set in the substantially same manner as the setting portion 309 and the setting portion 310, respectively, and thus, description thereof is omitted.

Figure 7A:
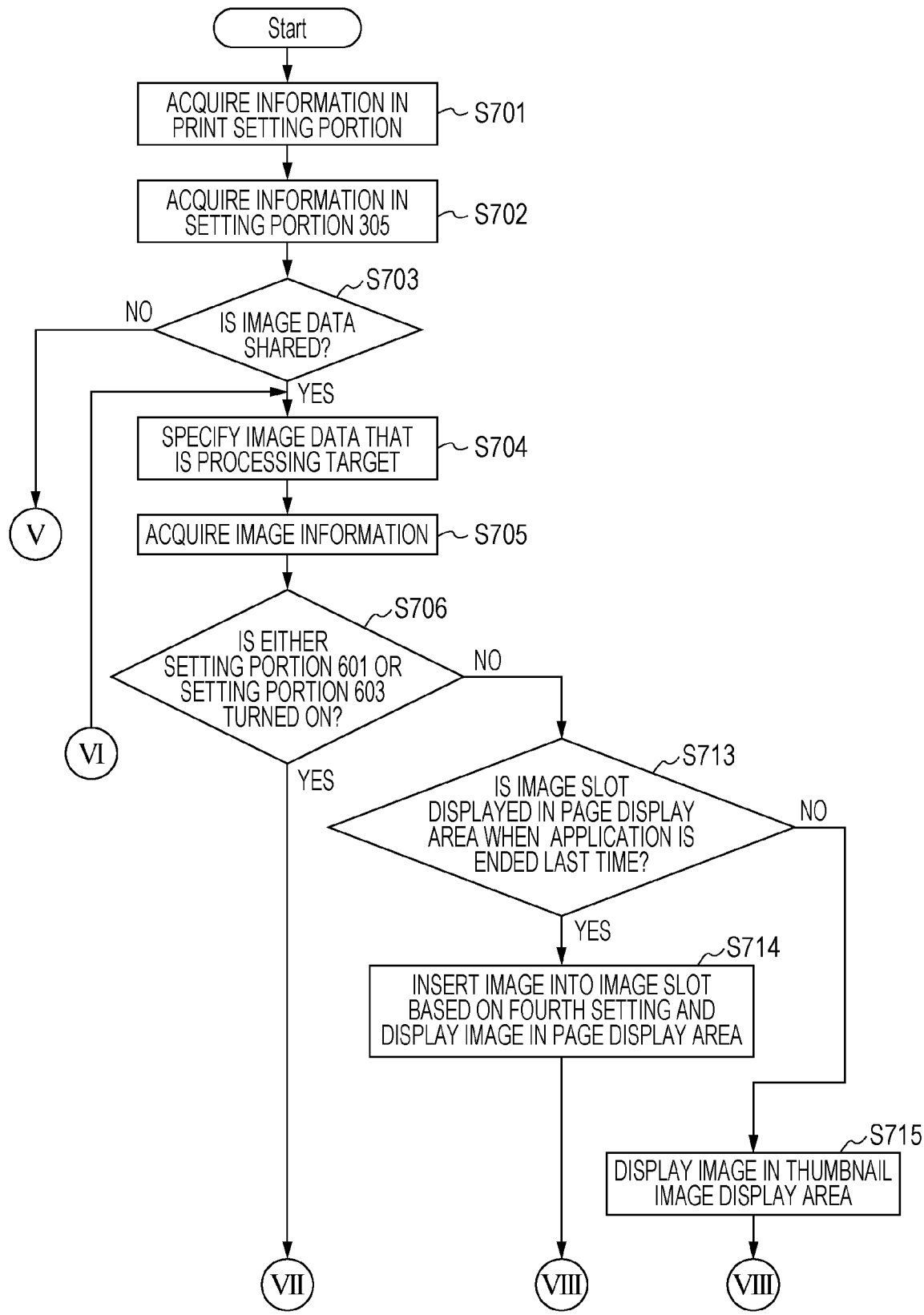
FIGS. 7A and 7B are a flowchart illustrating a processing example of an application according to the second embodiment.
Figure 7B:
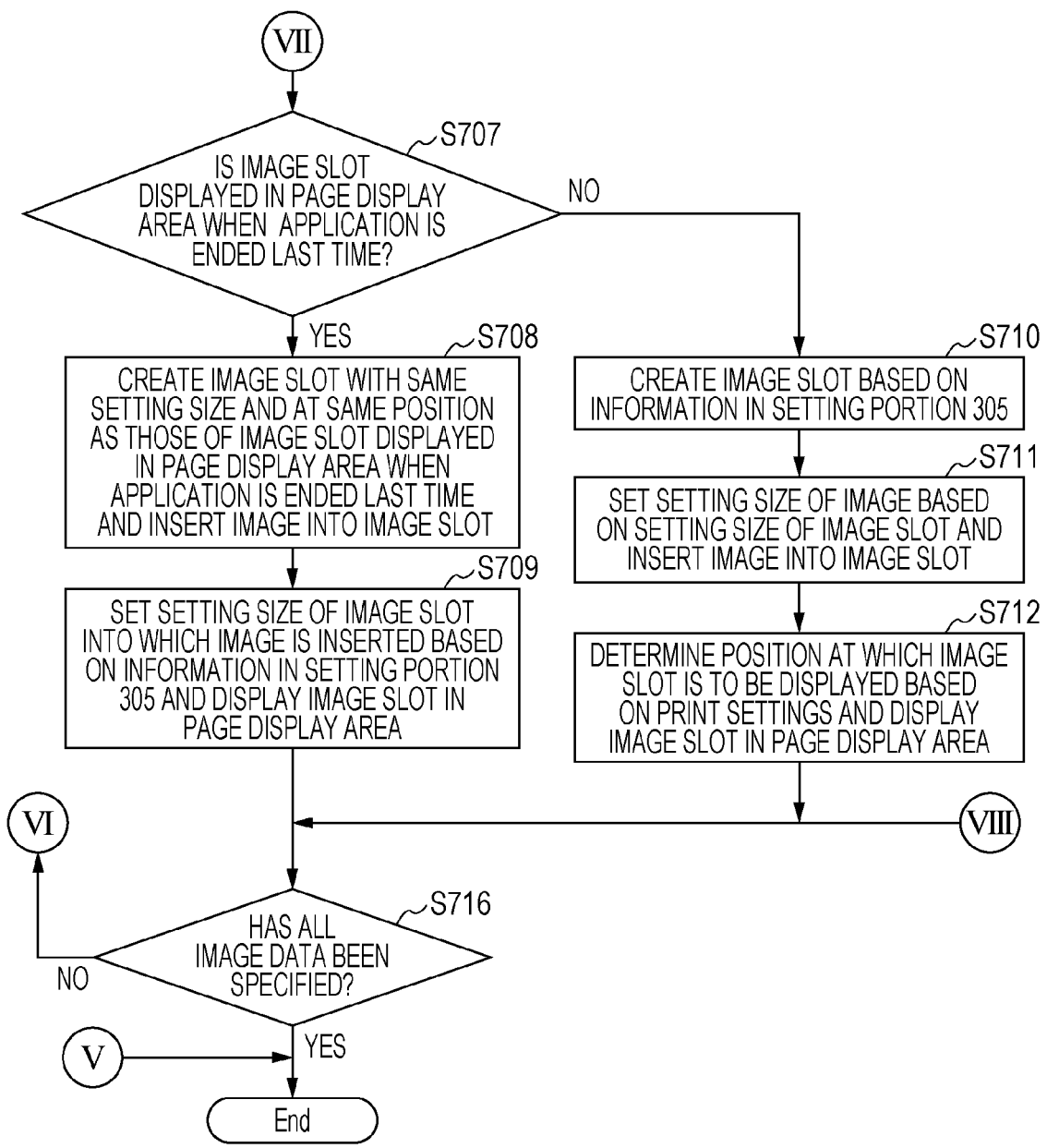

FIGS. 7A and 7B are a flowchart illustrating a processing example of the application 101a in a case where an image is displayed by an operation for the second image display method. For example, the flowchart is implemented by the CPU 108 reading out the application 101a stored in the ROM 110 to the RAM 109 and executing it. For example, the CPU 108 starts this processing in response to cooperative starting of the application 101a being caused by the application 101b.

S701 is substantially the same as S501, and thus, description thereof is omitted.

In S702, the CPU 108 acquires information that is set in the setting portion 305. The information that is set in the setting portion 305 includes, for example, whether the radio button in the setting portion 601 is turned on, whether the radio button in the setting portion 603 is turned on, and whether the radio button in the setting portion 307 is turned on. Furthermore, if the radio button in the setting portion 601 is turned on, the information that is set in the setting portion 305 includes information on an item that is selected in the setting portion 602. If the radio button in the setting portion 603 is turned on, the information that is set in the setting portion 305 includes information on the setting size of an image slot whose size is adjusted last time in the page display area 202 when the application 101a is ended last time.

Furthermore, if the radio button in the setting portion 307 is turned on, the information that is set in the setting portion 305 includes information on the setting size of an image slot that is displayed in the page display area 202 when the application 101a is ended last time.

S703 to S705 are substantially the same processing as S503 to S505, and thus, description thereof is omitted.

In S706, the CPU 108 determines whether the radio button in either the setting portion 601 or the setting portion 603 in the setting portion 305 is turned on. If the radio button in either the setting portion 601 or the setting portion 603 is turned on and either the fifth setting or the sixth setting is validated (YES in S706), the CPU 108 advances to S707. If none of the radio buttons in the setting portion 601 and the setting portion 603 are turned on and the fourth setting is validated (NO in S706), the CPU 108 advances to S713.

S707 and S708 are substantially the same processing as S507 and S508, and thus, description thereof is omitted.

In S709, the CPU 108 sets the setting size of the image slot created in S708, into which the image is inserted, on the basis of the information acquired in S702. Note that the setting size of the image inserted into the image slot is set in accordance with the settings of the setting size of the image slot.

Then, the image slot into which the image is inserted is displayed in the page display area 202, with a display size corresponding to a relative relationship of the setting size of the image slot to the setting size of a page displayed in the page display area 202.

Specifically, the CPU 108 changes the setting size of the image slot created in S708, into which the image is inserted, on the basis of the information acquired in S702. First, the CPU 108 checks states of the radio buttons in the setting portion 305. If the radio button in the setting portion 601 is turned on and the fifth setting is validated, the setting size of the image slot into which the image is inserted is set to a setting size based on the size selected in the setting portion 602. For example, if the size selected in the setting portion 602 is "setting size of image to be inserted", the setting size of the image slot is set to the setting size of the image inserted therein. That is, if the setting size of the image that is a printing target is adjusted in the application 101b and cooperative starting of the application 101a is caused, the setting size of the image slot into which the image is to be inserted is set to the setting size of the image adjusted in the application 101b. Thus, the image is inserted into the image slot with the setting size adjusted in the application 101b. Thus, an appropriate setting size can be set in the application 101a for the image based on the image data shared from the application 101b to the application 101a by the cooperative starting, and the image can be displayed with an appropriate display size. Furthermore, when the image is printed, the printing size is appropriate.

Now, a case where the radio button in the setting portion 603 is turned on and the sixth setting is validated will be described. In this case, the setting size of the image slot into which the image is inserted is set to the setting size of the image slot whose size is adjusted last time in the page display area 202 when the application 101a is ended last time. Note that the order of S708 and S709 may be interchanged. That is, the setting size of the image slot displayed in the page display area 202 when the application 101a is ended last time is set on the basis of the information acquired in S702. Subsequently, the setting size of the image is set on the basis of the setting size of the image slot, and the image is inserted into the image slot. Thus, the image slot into which the image is inserted based on the information acquired in S702 may be created.

In S710, which is performed if the determination in S707 is NO, the CPU 108 creates an image slot on the basis of the information acquired in S702. First, the CPU 108 checks states of the radio buttons in the setting portion 305. If the radio button in the setting portion 601 is turned on and the fifth setting is validated, the image slot is created with a setting size based on the size selected in the setting portion 602. For example, if the size selected in the setting portion 602 is "setting size of image to be inserted", the setting size of the image slot is set to the setting size of the image to be inserted therein.

That is, if the setting size of the image that is a printing target is adjusted in the application 101b and cooperative starting of the application 101a is caused, the setting size of the image slot into which the image is to be inserted is set to the setting size of the image adjusted in the application 101b.

If the radio button in the setting portion 603 is turned on and the sixth setting is validated, the image slot is created with the setting size of the image slot whose size is adjusted last time in the page display area 202 when the application 101a is ended last time.

S711 to S716 are substantially the same processing as S511 to S516, and thus, description thereof is omitted.

As described above, according to this embodiment, a user can display images in the application 101a, based on the image data shared from the application 101b by the cooperative starting, with an appropriate size in the application 101a. This can reduce image slots displayed in the page display area 202 with an unintended image slot size, thereby improving the user convenience. Furthermore, the second setting can be set to be valid for the setting size of the image slot to be displayed by the first image display method, and the third setting can be set to be valid and the first setting can be set to be valid for the setting size of the image slot to be displayed by the second image display method.

This can reduce the load on user operations, thereby improving the user convenience.

OTHER EMBODIMENTS

Although the above description has illustrated the case where the setting size or the display size of an image slot is determined on the basis of the settings on the setting screen in FIG. 3 or FIG. 6 and thereby the setting size or the display size of an image to be inserted into the image slot is also determined, some embodiments are not limited thereto. An image may be arranged without an image slot in the page display area 202. In such a case, the setting size or the display size of the image is determined on the basis of the settings on the setting screen in FIG. 3 or FIG. 6 by substantially the same method as the above method for determining the setting size or the display size of an image slot.

Some embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-058494, which was filed on Mar. 30, 2021 and which is hereby incorporated by reference herein in its entirety.

What is claimed is:

1. A non-transitory computer-readable storage medium storing a program for causing a computer to execute:
    a display step of displaying a first image and a second image on a single page on a screen provided by a first application program in response to a predetermined user operation being performed on a screen provided by a second application program that is different from the first application program; and
    an instruction step of selecting a print apparatus that prints the single page in response to a specific user operation being performed on the screen provided by the first application program and instructing the print apparatus to print,
    wherein a setting size of the first image displayed on the single page on the screen provided by the first application program in the display step is controlled to be a first size that is set in the second application program, and a setting size of the second image displayed on the single page on the screen provided by the first application program is controlled to be a second size that is set in the second application program.

2. The non-transitory computer-readable storage medium according to claim 1, wherein the setting sizes are sizes of the first image and the second image to be printed on a recording medium.

3. The non-transitory computer-readable storage medium according to claim 1, wherein the predetermined user operation is selection of the first application program on the screen provided by the second application program.

4. The non-transitory computer-readable storage medium according to claim 1, wherein
    in a case where a first arrangement mode is set, the first image controlled to have the first size and the second image controlled to have the second size are displayed on the single page on the screen provided by the first application program, and in a case where a second arrangement mode that is different from the first arrangement mode in an arrangement method is set, the first image controlled to have the first size is displayed on a first page on the screen provided by the first application program, and the second image controlled to have the second size is displayed on a second page on the screen provided by the first application program.

5. The non-transitory computer-readable storage medium according to claim 4, wherein the first arrangement mode is a mode in which a plurality of images are arranged with a predetermined interval therebetween in a predetermined direction from a start position on a single page on the screen provided by the first application program, and, in a case where any image among the plurality of images overlaps a non-printable area corresponding to an area not to be printed on a recording medium, a new line is started, and the image is automatically arranged on the new line.

6. The non-transitory computer-readable storage medium according to claim 1, wherein
in a case where a first mode is set, the first image controlled to have the first size and the second image controlled to have the second size are displayed on the single page on the screen provided by the first application program,
in a case where a second mode that is different from the first mode is set, the first image and the second image are displayed on the screen provided by the first application program on the basis of a size of an image slot that is displayed when the first application program is ended last time, and
in a case where a third mode that is different from the first mode and the second mode is set, the first image and the second image are displayed on the screen provided by the first application program on the basis of a size of an image slot whose size is adjusted last time in the first application program.

7. The non-transitory computer-readable storage medium according to claim 6, wherein the image slots are frames into which the first image and the second image are inserted when the first image and the second image are displayed on the screen provided by the first application program.

8. The non-transitory computer-readable storage medium according to claim 1, wherein
in the display step, an image size setting screen is displayed, and
the image size setting screen includes
a first image size setting area that accepts a size setting to be applied to an image displayed on the screen provided by the first application program by a drag-and-drop operation, and
a second image size setting area that accepts a size setting to be applied to an image displayed on the screen provided by the first application program by the predetermined user operation.

9. The non-transitory computer-readable storage medium according to claim 8, wherein the image size setting screen is a screen for setting a size of an image slot.

10. The non-transitory computer-readable storage medium according to claim 1, wherein a recording medium on which the single page is to be printed is a roll of paper.

11. An image processing apparatus comprising:
a display unit configured to display a first image and a second image on a single page on a screen provided by a first application program in response to a predetermined user operation being performed on a screen provided by a second application program that is different from the first application program; and
an instruction unit configured to select a print apparatus that prints the single page in response to a specific user operation being performed on the screen provided by the first application program and instruct the print apparatus to print,
wherein a setting size of the first image displayed on the single page on the screen provided by the first application program on the display unit is controlled to be a first size that is set in the second application program, and a setting size of the second image displayed on the single page on the screen provided by the first application program is controlled to be a second size that is set in the second application program.

12. The image processing apparatus according to claim 11, wherein the setting sizes are sizes of the first image and the second image to be printed on a recording medium.

13. The image processing apparatus according to claim 11, wherein
in a case where a first arrangement mode is set, the first image controlled to have the first size and the second image controlled to have the second size are displayed on the single page on the screen provided by the first application program, and
in a case where a second arrangement mode that is different from the first arrangement mode in an arrangement method is set, the first image controlled to have the first size is displayed on a first page on the screen provided by the first application program, and the second image controlled to have the second size is displayed on a second page on the screen provided by the first application program.

14. The image processing apparatus according to claim 13, wherein the first arrangement mode is a mode in which a plurality of images are arranged with a predetermined interval therebetween in a predetermined direction from a start position on a single page on the screen provided by the first application program, and, in a case where any image among the plurality of images overlaps a non-printable area corresponding to an area not to be printed on a recording medium, a new line is started, and the image is automatically arranged on the new line.

15. The image processing apparatus according to claim 11, wherein
in a case where a first mode is set, the first image controlled to have the first size and the second image controlled to have the second size are displayed on the single page on the screen provided by the first application program,
in a case where a second mode that is different from the first mode is set, the first image and the second image are displayed on the screen provided by the first application program on the basis of a size of an image slot that is displayed when the first application program is ended last time, and
in a case where a third mode that is different from the first mode and the second mode is set, the first image and the second image are displayed on the screen provided by the first application program on the basis of a size of an image slot whose size is adjusted last time in the first application program.

16. A control method for an image processing apparatus, the control method comprising:
a display step of displaying a first image and a second image on a single page on a screen provided by a first application program in response to a predetermined user operation being performed on a screen provided by a second application program that is different from the first application program; and an instruction step of selecting a print apparatus that prints the single page in response to a specific user operation being performed on the screen provided by the first application program and instructing the print apparatus to print, wherein a setting size of the first image displayed on the single page on the screen provided by the first application program in the display step is controlled to be a first size that is set in the second application program, and a setting size of the second image displayed on the single page on the screen provided by the first application program is controlled to be a second size that is set in the second application program.

17. The control method according to claim 16, wherein the setting sizes are sizes of the first image and the second image to be printed on a recording medium.

18. The control method according to claim 16, wherein
in a case where a first arrangement mode is set, the first image controlled to have the first size and the second image controlled to have the second size are displayed on the single page on the screen provided by the first application program, and
in a case where a second arrangement mode that is different from the first arrangement mode in an arrangement method is set, the first image controlled to have the first size is displayed on a first page on the screen provided by the first application program, and the second image controlled to have the second size is displayed on a second page on the screen provided by the first application program.

19. The control method according to claim 18, wherein the first arrangement mode is a mode in which a plurality of images are arranged with a predetermined interval therebetween in a predetermined direction from a start position on a single page on the screen provided by the first application program, and, in a case where any image among the plurality of images overlaps a non-printable area corresponding to an area not to be printed on a recording medium, a new line is started, and the image is automatically arranged on the new line.

20. The control method according to claim 16, wherein
in a case where a first mode is set, the first image controlled to have the first size and the second image controlled to have the second size are displayed on the single page on the screen provided by the first application program,
in a case where a second mode that is different from the first mode is set, the first image and the second image are displayed on the screen provided by the first application program on the basis of a size of an image slot that is displayed when the first application program is ended last time, and
in a case where a third mode that is different from the first mode and the second mode is set, the first image and the second image are displayed on the screen provided by the first application program on the basis of a size of an image slot whose size is adjusted last time in the first application program.

\* \* \* \* \*